(12) United States Patent
Erivantcev et al.

(10) Patent No.: US 11,531,392 B2
(45) Date of Patent: Dec. 20, 2022

(54) TRACKING UPPER ARM MOVEMENTS USING SENSOR MODULES ATTACHED TO THE HAND AND FOREARM

(71) Applicant: FINCHXR LTD., Limassol (CY)

(72) Inventors: Viktor Vladimirovich Erivantcev, Ufa (RU); Alexey Ivanovich Kartashov, Moscow (RU); Roman Tagirovich Karimov, Ufa (RU); Gary Stuart Yamamoto, Sacramento, CA (US); Guzel Kausarevna Khurmatullina, Ufa (RU)

(73) Assignee: FINCHXR LTD., Limassol (CY)

( * ) Notice: Subject to any disclaimer, the term of this patent is extended or adjusted under 35 U.S.C. 154(b) by 48 days.

(21) Appl. No.: 17/105,143

(22) Filed: Nov. 25, 2020

(65) Prior Publication Data

US 2021/0165486 A1 Jun. 3, 2021

Related U.S. Application Data

(60) Provisional application No. 62/942,289, filed on Dec. 2, 2019.

(51) Int. Cl.
*G06F 3/01* (2006.01)
*G06F 3/0346* (2013.01)
*G06F 1/16* (2006.01)

(52) U.S. Cl.
CPC ............ *G06F 3/014* (2013.01); *G06F 3/0346* (2013.01); *G06F 1/163* (2013.01); *G06F 3/011* (2013.01);
(Continued)

(58) Field of Classification Search
CPC ........ G06F 3/011; G06F 3/0346; G06F 3/014; G06F 2203/0331; G06F 1/163;
(Continued)

(56) References Cited

U.S. PATENT DOCUMENTS 7,565,295 B1 7/2009 Hernandez-rebollar
8,743,052 B1 * 6/2014 Keller ................. G06F 3/014
345/156
(Continued)

FOREIGN PATENT DOCUMENTS

CN 103226398 7/2013
WO 2016183812 11/2016

OTHER PUBLICATIONS

Title: Tracking Arm Movements to Generate Inputs for Computer Systems, U.S. Appl. No. 15/787,555, filed Oct. 18, 2017, Inventors: Viktor Erivantcev et al., Status: Patented Case, Status Date; Jul. 24, 2019.
(Continued)

*Primary Examiner* — Michael J Jansen, II
(74) *Attorney, Agent, or Firm* — Greenberg Traurig

(57) ABSTRACT

A system, having: a first sensor module having an inertial measurement unit and configured to be attached to a forearm of a user and to generate first motion data identifying an orientation of the forearm connected between a hand of the user and an upper arm of the user; a second sensor module having an inertial measurement unit and configured to be attached to the hand of the user and to generate second motion data identifying an orientation of the hand; and a computing device communicatively coupled to the first sensor module and the second sensor module through communication links, the computing device configured to calculate, based on the orientation of the forearm, a position of the forearm, and the orientation of the hand, an orientation of the upper arm.

20 Claims, 3 Drawing Sheets

(52) U.S. Cl.
CPC .............. *G06F 2200/1637* (2013.01); *G06F 2203/0331* (2013.01)

(58) Field of Classification Search
CPC ............ G06F 2200/1637; A63F 13/211; A63F 13/235; A63F 13/428; A63F 2300/105; G01C 21/16
See application file for complete search history.

(56) References Cited

U.S. PATENT DOCUMENTS

| | | | | |
|---|---|---|---|---|
| 8,870,655 | B2* | 10/2014 | Ikeda | A63F 13/213 463/36 |
| 9,278,453 | B2 | 3/2016 | Assad | |
| D772,986 | S | 11/2016 | Chen et al. | |
| 9,501,152 | B2* | 11/2016 | Bedikian | G06F 3/04845 |
| 9,582,035 | B2* | 2/2017 | Connor | A61B 5/4875 |
| 9,595,172 | B2* | 3/2017 | Moeller | G08B 6/00 |
| 9,772,684 | B2* | 9/2017 | Shi | G06F 1/163 |
| 9,891,718 | B2 | 2/2018 | Connor | |
| 9,916,015 | B2* | 3/2018 | Nakasu | G06F 3/0325 |
| 10,055,018 | B2* | 8/2018 | Tokubo | G06F 3/016 |
| 10,156,908 | B2* | 12/2018 | Stafford | G06F 3/014 |
| 10,379,613 | B2 | 8/2019 | Erivantcev et al. | |
| 10,416,755 | B1* | 9/2019 | Erivantcev | G06F 3/038 |
| 10,429,888 | B2* | 10/2019 | Connor | G06F 3/014 |
| 10,444,834 | B2* | 10/2019 | Vescovi | G06F 3/0346 |
| 10,503,275 | B2* | 12/2019 | Keller | G06F 3/017 |
| 10,509,464 | B2* | 12/2019 | Erivantcev | G06F 3/011 |
| 10,509,469 | B2* | 12/2019 | Erivantcev | G06F 3/038 |
| 10,521,011 | B2* | 12/2019 | Erivantcev | G06F 1/1686 |
| 10,534,431 | B2 | 1/2020 | Erivantcev et al. | |
| 10,540,006 | B2* | 1/2020 | Erivantcev | G06F 3/011 |
| 10,635,166 | B2* | 4/2020 | Erivantcev | G06N 3/08 |
| 10,705,113 | B2* | 7/2020 | Erivantcev | G06F 3/0346 |
| 10,775,946 | B2* | 9/2020 | Erivantcev | G06F 3/017 |
| 10,809,797 | B1* | 10/2020 | Kartashov | G06F 3/014 |
| 10,838,495 | B2* | 11/2020 | Erivantcev | A63F 13/235 |
| 10,860,091 | B2* | 12/2020 | Erivantcev | G06F 3/0346 |
| 10,976,863 | B1* | 4/2021 | Erivantcev | G06T 7/75 |
| 11,009,941 | B2* | 5/2021 | Erivantcev | G06F 3/012 |
| 11,009,964 | B2* | 5/2021 | Erivantcev | G06F 3/011 |
| 11,016,116 | B2* | 5/2021 | Erivantcev | G06K 9/00 |
| 11,054,923 | B2* | 7/2021 | Erivantcev | G06F 3/014 |
| 11,079,860 | B2* | 8/2021 | Erivantcev | G06V 10/82 |
| 11,093,036 | B2* | 8/2021 | Erivantcev | G06F 3/017 |
| 11,175,729 | B2* | 11/2021 | Erivantcev | G06F 3/0346 |
| 11,237,632 | B2* | 2/2022 | Erivantcev | H04B 5/0037 |
| 11,409,357 | B2* | 8/2022 | Song | G06F 3/011 |
| 2007/0050597 | A1 | 3/2007 | Ikeda | |
| 2007/0263001 | A1 | 11/2007 | Trzecieski | |
| 2010/0023314 | A1* | 1/2010 | Hernandez-Rebollar | G06V 30/268 704/E13.001 |
| 2012/0025945 | A1 | 2/2012 | Yazadi et al. | |
| 2013/0317648 | A1* | 11/2013 | Assad | A61B 5/389 700/258 |
| 2014/0176439 | A1* | 6/2014 | Keller | G06F 3/014 345/159 |
| 2014/0201689 | A1 | 7/2014 | Bedikian et al. | |
| 2014/0313022 | A1 | 10/2014 | Moeller et al. | |
| 2015/0277559 | A1 | 10/2015 | Vescovi et al. | |
| 2015/0309535 | A1* | 10/2015 | Connor | A61B 5/1477 361/679.03 |
| 2015/0358543 | A1 | 12/2015 | Kord | |
| 2016/0054797 | A1 | 2/2016 | Tokubo et al. | |
| 2016/0077581 | A1* | 3/2016 | Shi | G06F 1/163 340/12.5 |
| 2016/0077608 | A1 | 3/2016 | Nakasu et al. | |
| 2016/0306431 | A1 | 10/2016 | Stafford et al. | |
| 2016/0313798 | A1 | 10/2016 | Connor | |
| 2016/0349790 | A1* | 12/2016 | Connor | G06F 3/017 |
| 2017/0308165 | A1* | 10/2017 | Erivantcev | A63F 13/235 |
| 2017/0352188 | A1 | 12/2017 | Levitt | |
| 2018/0217680 | A1 | 8/2018 | Sudou et al. | |
| 2018/0313867 | A1* | 11/2018 | Erivantcev | G01P 15/18 |
| 2018/0335834 | A1* | 11/2018 | Erivantcev | B81B 7/02 |
| 2018/0335843 | A1 | 11/2018 | Erivantcev et al. | |
| 2018/0335855 | A1 | 11/2018 | Erivantcev et al. | |
| 2019/0187784 | A1* | 6/2019 | Erivantcev | G06F 1/1694 |
| 2019/0212359 | A1* | 7/2019 | Erivantcev | G06F 3/017 |
| 2019/0212807 | A1* | 7/2019 | Erivantcev | G06F 3/011 |
| 2019/0332171 | A1 | 10/2019 | Erivantcev et al. | |
| 2019/0339766 | A1* | 11/2019 | Erivantcev | G06V 40/20 |
| 2019/0369715 | A1* | 12/2019 | Erivantcev | G06V 40/23 |
| 2020/0033937 | A1* | 1/2020 | Erivantcev | G06F 3/0346 |
| 2020/0081534 | A1* | 3/2020 | Erivantcev | G06F 3/03547 |
| 2020/0201460 | A1* | 6/2020 | Erivantcev | G06F 3/017 |
| 2020/0225738 | A1* | 7/2020 | Erivantcev | G06N 3/08 |
| 2020/0319721 | A1* | 10/2020 | Erivantcev | G06N 3/08 |
| 2020/0387227 | A1* | 12/2020 | Erivantcev | G06F 3/011 |
| 2021/0041476 | A1* | 2/2021 | Kartashov | G06F 3/012 |
| 2021/0068674 | A1* | 3/2021 | Erivantcev | A61B 5/1112 |
| 2021/0072820 | A1* | 3/2021 | Erivantcev | G06F 3/011 |
| 2021/0089116 | A1* | 3/2021 | Erivantcev | G06T 7/20 |
| 2021/0089162 | A1* | 3/2021 | Erivantcev | G06F 3/0425 |
| 2021/0109606 | A1* | 4/2021 | Erivantcev | G06F 3/038 |
| 2021/0132681 | A1* | 5/2021 | Song | G06F 3/016 |
| 2021/0165486 | A1* | 6/2021 | Erivantcev | G06F 3/0346 |
| 2021/0208180 | A1* | 7/2021 | Erivantcev | G06T 7/74 |
| 2021/0278898 | A1* | 9/2021 | Erivantcev | H04B 5/0012 |
| 2021/0318759 | A1* | 10/2021 | Erivantcev | G06F 3/0346 |
| 2021/0389829 | A1* | 12/2021 | Erivantcev | H02J 7/0044 |

OTHER PUBLICATIONS

Title: Tracking Finger Movements to Generate Inputs for Computer Systems, U.S. Appl. No. 15/792,255, filed Oct. 24, 2017, Inventors: Viktor Erivantcev et al., Status: Patented Case, Status Date: Dec. 24, 2019.

Title: Tracking Arm Movements to Generate Inputs for Computer Systems, U.S. Appl. No. 16/508,249, filed Jul. 10, 2019, Inventors: Viktor Erivantcev et al., Status: Non Final Action dated Aug. 2, 2019.

Forward kinematics, Wikipedia, retrieved from https://en.wikipedia.org/wiki/Forward_kinematics on Sep. 21, 2017.

* cited by examiner

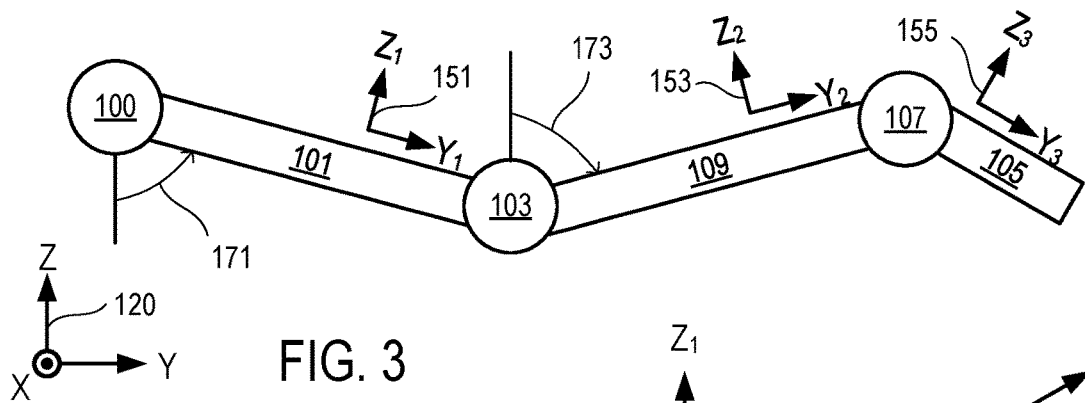

FIG. 3

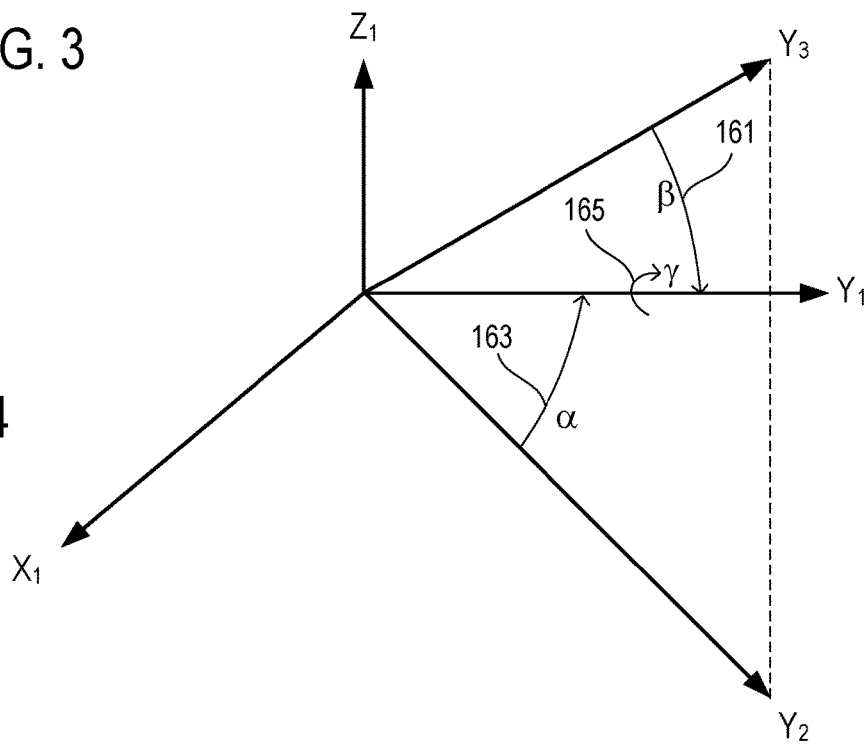

FIG. 4

```
┌─────────────────────────────────────────────────────┐
│ Receive motion data from an arm module identifying an│
│    orientation of a forearm of a user   201          │
└─────────────────────────────────────────────────────┘
                          │
                          ▼
┌─────────────────────────────────────────────────────┐
│Receive motion data from a handheld module identifying an│
│    orientation of a hand of the user   203           │
└─────────────────────────────────────────────────────┘
                          │
                          ▼
┌─────────────────────────────────────────────────────┐
│ Calculate an orientation of an upper arm of the user based on│
│ the orientation of the forearm, a position of the forearm, and│
│ the orientation of the hand, without using a sensor module on│
│                 the upper arm   205                  │
└─────────────────────────────────────────────────────┘
```

FIG. 5

```
┌─────────────────────────────────────────────────────────────────┐
│ Project, on to a horizontal plane, a lengthwise direction of    │
│ the forearm as a projection of a lengthwise direction of the    │
│ upper arm in the horizontal plane                               │
│                            211                                  │
└─────────────────────────────────────────────────────────────────┘
                                │
                                ▼
┌─────────────────────────────────────────────────────────────────┐
│ Calculate an elevation change of the wrist caused by the upper  │
│ arm tilting out of the horizontal plane based on the measured   │
│ elevation of the wrist, the orientation of the forearm, and a   │
│ length of the forearm    213                                    │
└─────────────────────────────────────────────────────────────────┘
                                │
                                ▼
┌─────────────────────────────────────────────────────────────────┐
│ Determine the lengthwise direction of the upper arm based on    │
│ the calculated elevation change caused by the upper arm tilting │
│ out of the horizontal plane, by rotating the projection of the  │
│ lengthwise direction of the upper arm in a vertical plane that  │
│ passes the projection of the lengthwise direction of the upper  │
│ arm in the horizontal plane to match the elevation change       │
│ caused by the upper arm    215                                  │
└─────────────────────────────────────────────────────────────────┘
                                │
                                ▼
┌─────────────────────────────────────────────────────────────────┐
│ Determine a first orientation of a coordinate system attached   │
│ to the hand by rotating a lengthwise direction of the hand      │
│ along a shortest arc to the lengthwise direction of the upper   │
│ arm   217                                                       │
└─────────────────────────────────────────────────────────────────┘
                                │
                                ▼
┌─────────────────────────────────────────────────────────────────┐
│ Determine a second orientation of a coordinate system attached  │
│ to the forearm by rotating the lengthwise direction of the      │
│ forearm along a shortest arc to the lengthwise direction of     │
│ the upper arm   219                                             │
└─────────────────────────────────────────────────────────────────┘
                                │
                                ▼
┌─────────────────────────────────────────────────────────────────┐
│ Determine a relative twist between the first orientation and    │
│ the second orientation along the lengthwise direction of the    │
│ upper arm   221                                                 │
└─────────────────────────────────────────────────────────────────┘
                                │
                                ▼
┌─────────────────────────────────────────────────────────────────┐
│ Determine the orientation of the upper arm from the relative    │
│ twist between the first orientation and the second orientation, │
│ and the lengthwise direction of the upper arm   223             │
└─────────────────────────────────────────────────────────────────┘
```

FIG. 6

TRACKING UPPER ARM MOVEMENTS USING SENSOR MODULES ATTACHED TO THE HAND AND FOREARM

RELATED APPLICATIONS

The present application claims the benefit of the filing date of U.S. Provisional App. Ser. No. 62/942,289, filed on Dec. 2, 2019, the entire disclosure of which is hereby incorporated herein by reference.

The present application relates to U.S. patent application Ser. No. 16/508,249, filed Jul. 10, 2019 and entitled "Tracking Arm Movements to Generate Inputs for Computer Systems," which is a continuation application of U.S. patent application Ser. No. 15/787,555, filed Oct. 18, 2017 and issued as U.S. Pat. No. 10,379,613, which claims the benefit of the filing date of Prov. U.S. Pat. App. Ser. No. 62/507,085, filed May 16, 2017 and entitled "Methods, Systems, and Apparatuses for Calculating the Position of a Skeletal 3-D Model in Space using Predictive Interpolation Algorithms", the entire disclosures of which applications are hereby incorporated herein by reference.

The present application also relates to U.S. patent application Ser. No. 16/576,672 (the '672 application), filed Sep. 19, 2019 and entitled "Orientation Determination based on Both Images and Inertial Measurement Units", the disclosure of which is hereby incorporated herein by reference.

The present application relates to U.S. patent application Ser. No. 15/492,915, filed Apr. 20, 2017, assigned U.S. Pat. App. Pub. No. 2017/0308165, and entitled "Devices for Controlling Computers based on Motions and Positions of Hands", which claims the benefit of the filing dates of 62/325,925, filed Apr. 21, 2016 and entitled "Hand-Worn Devices for Controlling Computers based on Motions and Positions of Hands and Fingers", Prov. U.S. Pat. App. Ser. No. 62/463,183, filed Feb. 24, 2017 and entitled "Devices for Controlling Computers based on Motions and Positions of Hands and Arms," Prov. U.S. Pat. App. Ser. No. 62/463, 209, filed Feb. 24, 2017 and entitled "Devices for Controlling Computers based on Motions and Positions of Hands," Prov. U.S. Pat. App. Ser. No. 62/463,252, filed Feb. 24, 2017 and entitled "Devices for Controlling Computers based on Motions and Positions of Hands and Arms," the entire disclosures of which applications are hereby incorporated herein by reference.

FIELD OF THE TECHNOLOGY

The embodiments disclosed herein relate to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

The disclosures of the above discussed patent documents are hereby incorporated herein by reference.

SUMMARY

The various embodiments of the present disclosure involve determining a position of the forearm, and the orientation of the hand, an orientation of the upper arm. Without limiting the scope of the present embodiments as expressed by the claims that follow, the following examples are provided. While the specification may refer to "an embodiment" it should be clear that the examples can be used in any combination.

In one example, a system is disclosed that includes a first sensor module having an inertial measurement unit and configured to be attached to a forearm of a user and to generate first motion data identifying an orientation of the forearm. The system includes the forearm that can be connected between a hand of the user and an upper arm of the user. The system also includes a second sensor module having an inertial measurement unit and configured to be attached to the hand of the user and to generate second motion data identifying an orientation of the hand. The first sensor module and the second sensor module are configured to determine an elevation of a wrist of the user connecting the forearm and the hand. The system includes a computing device communicatively coupled to the first sensor module and the second sensor module through communication links, the computing device configured to calculate, based on the orientation of the forearm, a position of the forearm, and the orientation of the hand, an orientation of the upper arm.

In another example, a method of determining, by a computing device communicatively coupled to a first sensor module and a second sensor module, an orientation of the upper arm based on the orientation of the forearm, a position of the forearm, and the orientation of the hand. The method includes identifying an orientation of a forearm, by a first sensor module configured to be attached to the forearm of a user and to generate first motion data with the forearm connected between a hand of the user and an upper arm of the user. The method includes identifying an orientation of the hand by a second sensor module configured to be attached to the hand of the user and to generate second motion data. The method includes determining an elevation of a wrist of the user using the first sensor module and the second sensor module with the wrist connecting the forearm and the hand. The method includes determining, by a computing device communicatively coupled to the first sensor module and the second sensor module, an orientation of the upper arm based on the orientation of the forearm, a position of the forearm, and the orientation of the hand.

BRIEF DESCRIPTION OF THE DRAWINGS

The embodiments are illustrated by way of example and not limitation in the figures of the accompanying drawings in which like references indicate similar elements.

FIG. 3 illustrates a skeleton model of an arm.

FIG. 4 illustrates the determination of the orientation of an upper arm according to one embodiment.

FIG. 5 shows a method to compute the orientation of an upper arm according to one embodiment.

FIG. 6 shows a detailed method to compute the orientation of an upper arm according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

At least some embodiments disclosed herein allow the tracking of the movements of an upper arm without a sensor device being attached to the upper arm. The upper arm orientation can be estimated, predicted, or computed from the orientation of the forearm connected to the upper arm and the orientation of the hand connected to the forearm.

Figure 1:
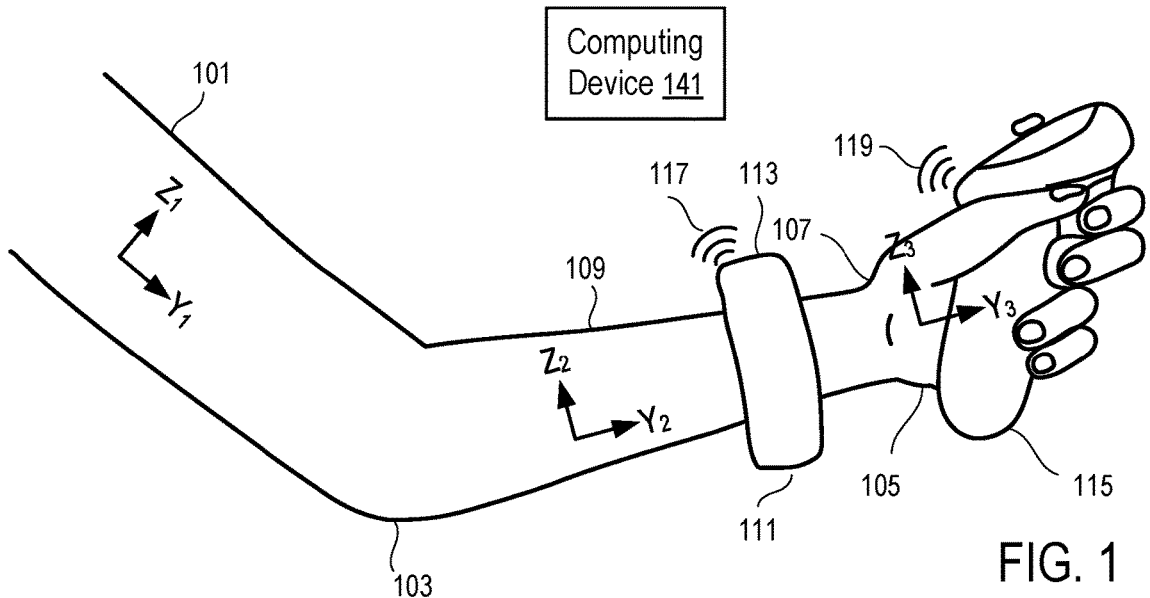
FIG. 1 illustrates a system to track arm movements according to one embodiment.

FIG. 1 illustrates a system to track arm movements according to one embodiment.

In FIG. 1, an elbow joint (103) of a user connects an upper arm (101) and a forearm (109) of the user; and a wrist (107) connects the forearm (109) to a hand (105) of the user.

The orientation of the forearm (109) is tracked/determined using a forearm module (113) that can be attached to the forearm (109) at a location near the wrist (107) via a wristband (111).

The orientation of the upper arm (101) can be represented by a local coordinate system $X_1Y_1Z_1$ fixed to the upper arm (101), where the lengthwise direction $Y_1$ is in parallel with the direction from the shoulder to the elbow joint (103), the direction $X_1$ is in parallel with the direction from the inner side of the upper arm (101) to the outer side of the upper arm (101), and the direction $Z_1$ is in parallel with the direction from the back side of the upper arm (101) to the front side of the upper arm (101).

The orientation of the hand (105) is tracked/determined using a handheld module (115). FIG. 1 illustrates a handheld module (115) in a form of a handheld controller. In other embodiments, the handheld module (115) can be configured as a ring module attached to a finger (e.g., index finger of the hand (105)); and the hand orientation is measured when the finger is in a predefined position relative to the hand orientation. For example, the orientation of the hand can be determined from the orientation measurement of the ring module, when the index finger bends towards the thumb and the thumb touches a touch pad configured on the ring, e.g., as illustrated in FIG. 10 of U.S. patent application Ser. No. 16/576,672 (the '672 application), filed Sep. 19, 2019 and entitled "Orientation Determination based on Both Images and Inertial Measurement Units", the disclosure of which is hereby incorporated herein by reference. For example, the techniques of determining the orientation of the hand disclosed in the '672 application can be used.

The orientation of the hand (105) can be represented by a local coordinate system $X_3Y_3Z_3$ fixed to the hand (105), where the lengthwise direction $Y_3$ is in parallel with the direction from the wrist (107) to the fingers, the direction $X_3$ is in parallel with the direction from the back of the hand (105) to the palm of the hand (105), and the direction $Z_3$ is in parallel with the direction from the edge of the palm to the thumb on the hand (105).

The forearm module (113) (e.g., a smart watch, a forearm band) and the handheld module (115) (e.g., a handheld controller, a ring) separately report their motion/orientation parameters to a computing device (141) using wireless connections (117 and 119), such as a personal area wireless network connection (e.g., Bluetooth connections), or a local area wireless network connection (e.g., Wi-Fi connections).

Alternatively, the forearm module (113) may report its measurements to the handheld module (115) (via a wired or wireless connection); and the handheld module (115) communicates the motion/orientation measurements to the computing device (141) (e.g., via a wired or wireless connection).

The orientation of the forearm (109) can be represented by a local coordinate system $X_2Y_2Z_2$ fixed to the forearm (109), where the lengthwise direction $Y_2$ is in parallel with the direction from the elbow joint (103) to the wrist (107), the direction $X_3$ is in parallel with the direction from the outside of the forearm (109) to the inside of the forearm (109), and the direction $Z_3$ is in parallel with the front side of the forearm (109) to the backside of the forearm (109) (e.g., when the arm is down with the palm of the hand (105) facing the body of the user).

For example, the handheld module (115) and the forearm module (113) can be respectively a base unit (or a game controller) and an arm/shoulder module discussed in U.S. patent application Ser. No. 15/492,915, filed Apr. 20, 2017, published as U.S. App. Pub. No. 2017/0308165 on Oct. 26, 2017, and entitled "Devices for Controlling Computers based on Motions and Positions of Hands", the entire disclosure of which application is hereby incorporated herein by reference.

At least some embodiments disclosed herein allow the orientation of the upper arm (101) to be estimated, predicted, or calculated from the orientation of the hand (105) and the orientation of the forearm (109) without the need for an additional sensor module to track the orientation of the upper arm (101), as further discussed below.

Figure 2:
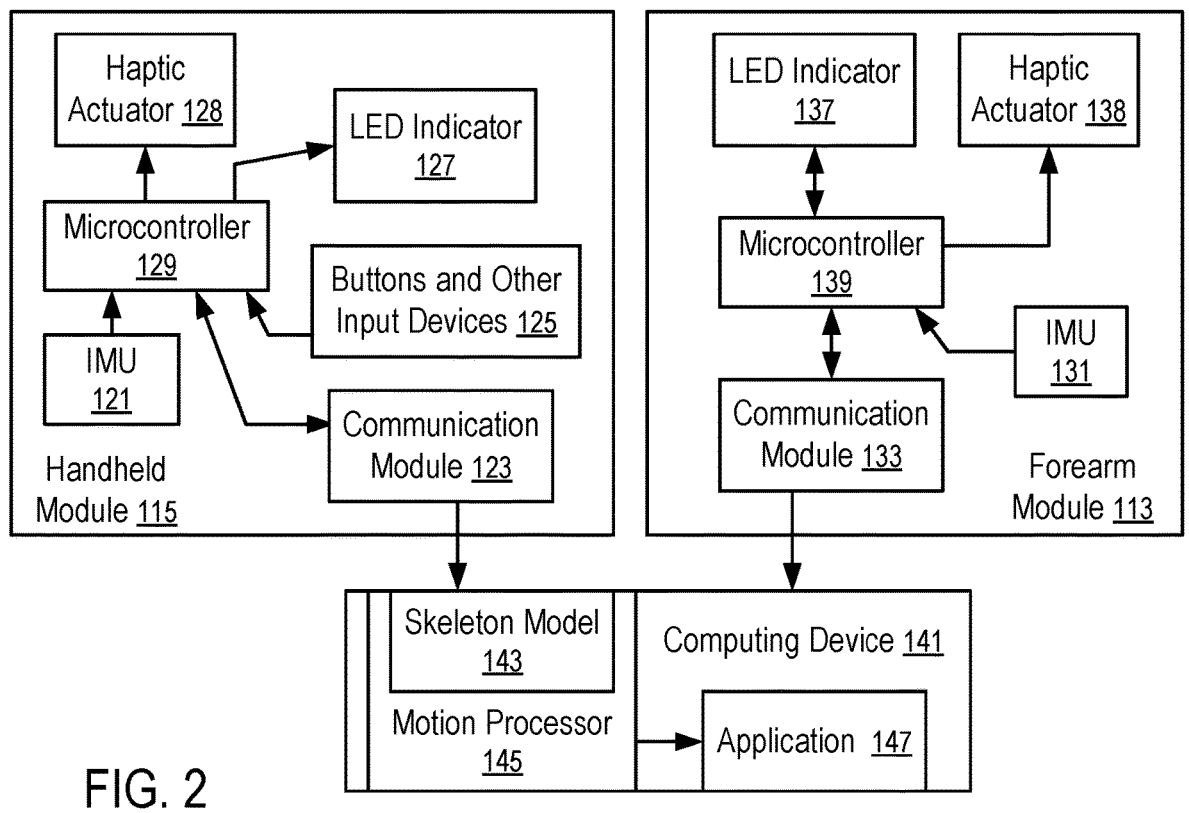
FIG. 2 illustrates a system to control computer operations according to one embodiment.

FIG. 2 illustrates a system to control computer operations according to one embodiment. For example, the system of FIG. 2 can be implemented via attaching the handheld module (115) and the forearm module (113) to the hand (105) and the forearm (109) respectively in a way illustrated in FIG. 1.

In FIG. 2, the handheld module (115) and the forearm module (113) have micro-electromechanical system (MEMS) inertial measurement units (IMUs) (121 and 131) that measure motion parameters and determine orientations of the hand (105) and the forearm (109).

Each of the IMUs (131, 121) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (141) has a motion processor (145), which includes a skeleton model (143) of the upper arm (101), the forearm (109), and the hand (105) connected via the elbow joint (103) and the wrist (107) (e.g., illustrated FIG. 3). The motion processor (145) controls the movements of the corresponding parts of the skeleton model (143) according to the movements/orientations of the upper arm (101) and the hand (105) measured by the forearm module (113) and the handheld module (115).

Since the movements/orientations of the upper arm (101) can be calculated/estimated/predicted from the orientation of the forearm module (113) and the orientation of the handheld module (115), as discussed further below, it is not necessary to attach a separate sensor module to the upper arm (101) to measure its orientation.

The skeleton model (143) as controlled by the motion processor (145) to generate inputs for an application (147) running in the computing device (141). For example, the skeleton model (143) can be used to control the movement of an avatar/model of the arm of the user of the computing device (141) in a video game, a virtual reality, a mixed reality, or augmented reality, etc.

In some applications, the handheld module (115) can be replaced with a forearm module (113) attached to the hand (105) via a ring. In some embodiments, the forearm module (113) is configured as a smart watch.

Preferably, the forearm module (113) has a microcontroller (139) to process the sensor signals from the IMU (131) of the forearm module (113) and a communication module (133) to transmit the motion/orientation parameters of the forearm module (113) to the computing device (141). Similarly, the handheld module (115) has a microcontroller (129) to process the sensor signals from the IMU (121) of the handheld module (115) and a communication module (133) to transmit the motion/orientation parameters of the handheld module (115) to the computing device (141).

Optionally, the forearm module (113) and the handheld module (115) have LED indicators (137 and 127) respectively to indicate the operating status of the modules (113 and 115).

Optionally, the forearm module (113) and the handheld module (115) have haptic actuators (138 and 128) respectively to provide haptic feedback to the user via the modules (113 and 115).

Optionally, the handheld module (115) has buttons and other input devices (125), such as a touch sensor, a joystick, etc.

Typically, an IMU (e.g., 131 or 121) in a module (e.g., 113 or 115) generates acceleration data from accelerometers, angular velocity data from gyrometers/gyroscopes, and/or orientation data from magnetometers. The microcontrollers (139 and 129) perform preprocessing tasks, such as filtering the sensor data (e.g., blocking sensors that are not used in a specific application), applying calibration data (e.g., to correct the average accumulated error computed by the computing device (141)), transforming motion/position/orientation data in three axes into a quaternion, and packaging the preprocessed results into data packets (e.g., using a data compression technique) for transmitting to the host computing device (141) with a reduced bandwidth requirement and/or communication time.

Each of the microcontrollers (129, 139) may include a memory storing instructions controlling the operation of the respective microcontroller (129 or 139) to perform primary processing of the sensor data from the IMU (121, 131) and control the operations of the communication module (123, 133), and/or other components, such as the LED indicator (127, 137), the haptic actuator (128, 138), buttons and other input devices (125).

The computing device (141) may include one or more microprocessors and a memory storing instructions to implement the motion processor (145). The motion processor (145) may also be implemented via hardware, such as Application-Specific Integrated Circuit (ASIC) or Field-Programmable Gate Array (FPGA).

In some instances, one of the modules (113 and 115) is configured as a primary input device; and the other module is configured as a secondary input device that is connected to the computing device (141) via the primary input device. A secondary input device may use the microprocessor of its connected primary input device to perform some of the preprocessing tasks. A module that communicates directly to the computing device (141) is consider a primary input device, even when the module does not have a secondary input device that is connected to the computing device via the primary input device.

In some instances, the computing device (141) specifies the types of input data requested, and the conditions and/or frequency of the input data; and the modules (113 and 115) report the requested input data under the conditions and/or according to the frequency specified by the computing device (141). Different reporting frequencies can be specified for different types of input data (e.g., accelerometer measurements, gyroscope/gyrometer measurements, magnetometer measurements, position, orientation, velocity).

In general, the computing device (141) may be a data processing system, such as a mobile phone, a desktop computer, a laptop computer, a head mount virtual reality display, a personal medial player, a tablet computer, etc.

FIG. 3 illustrates a skeleton model of an arm. For example, the skeleton model of FIG. 3 can be used in the motion processor (145) of FIG. 2 to determine the orientation of the upper arm (101) that does not have an attached sensor module, as illustrated in FIG. 1.

FIG. 3 shows the geometrical representations of the upper arm (101), the forearm (109), and the hand (105) in relation with the elbow joint (103) and the wrist (107) relative to the shoulder (100).

Each of the upper arm (101), the forearm (109), and the hand (105) has an orientation relative to a common reference system XYZ (120) (e.g., relative to the shoulder (100), a room, or a location on the Earth where the user is positioned). The orientations of the upper arm (101), the forearm (109), or the hand (105) can be indicated by local coordinate systems (151, 153, or 155) aligned with the upper arm (101), the forearm (109), or the hand (105).

The orientation of the forearm (109) and the orientation of the hand (105), as represented by the local coordinate systems (151 and 155) can be determined from the motion parameters measured by the IMUs in the module (131 and 121) attached to the forearm (109) and the hand (105).

The motion processor (145) is configured use a set of assumed relations between the movements of the forearm (109) and the hand (105) to calculate or estimate the orientation of the upper arm (101) based on the orientation of the forearm (109) and the orientation of the hand (105), as further discussed below. Thus, the upper arm (101) does not need an attached IMU for the determination of its orientation.

In one embodiment, the user movements are limited to, or initially assumed to be of, a type where the vertical projection of the lengthwise direction $Y_1$ of the upper arm (101) in a horizontal plane XY coincides with the vertical projection of the lengthwise direction $Y_2$ of the forearm (109) in the horizontal plane XY.

As illustrated in FIG. 3, a global coordinate system 120 has directions X, Y, and Z, where the X and Y directions define the horizontal plane XY. For example, the torso of the user is substantially in the upright position. The vertical direction Z is along the direction from the feet of the user to the head of the user. The front direction Y corresponds to the direction pointing from the back of the user to the front of the user; and the size direction X is parallel to the left to right direction. Since the vertical projection of the lengthwise direction $Y_1$ of the upper arm (101) in the horizontal plane XY coincides with the vertical projection of the lengthwise direction $Y_2$ of the forearm (109) in the horizontal plane XY, the vertical projection of the lengthwise direction $Y_1$ of the upper arm (101) in the horizontal plane XY can be determined from the projection of the lengthwise direction $Y_2$ of the forearm (109) in the horizontal plane XY.

The lengthwise direction $Y_1$ of the upper arm (101) in the three-dimensional space XYZ (120) can be determined from the direction of the vertical projection of the lengthwise direction $Y_1$ of the upper arm (101) in the horizontal plane XY and the degree of incline angle (171) of the upper arm (101) out of the horizontal plane XY.

For example, in FIG. 3, the vertical projections of the lengthwise direction $Y_1$ of the upper arm (101) and the lengthwise direction $Y_2$ of the forearm (109) are in the direction of Y. Thus, the lengthwise direction $Y_1$ of the upper arm (101) is in the plane vertical YZ with an incline angle (171). Similarly, the lengthwise direction $Y_2$ of the forearm (109) is in the vertical plane YZ with an incline angle (173). The incline angles (171 and 173) and the lengths of the forearm (109) and the upper arm (101) determine the vertical position of the wrist (107). The vertical position of the wrist (107) can be tracked using an IMU unit in the forearm module (113) or the handheld module (115).

For example, after the vertical position of the wrist (107) is calibrated at a position where the wrist (107) is at the height of the shoulder (100) (e.g., when the arm is extended straight horizontally), the change of the height of the wrist (107) from this position can be tracked using an accelerometer in the IMU unit in the forearm module (113) or the handheld module (115). The change is the sum of the height change caused by the incline angle (173) of the forearm (109) and the height change caused by the incline angle (171) of the upper arm (101). Thus, the tracked change of the height of the wrist (107) and the incline angle (173) of the forearm (109) can be used to calculate the incline angle (171) of the upper arm (101).

In another example, the initial vertical position of the wrist (107) is calibrated at a position where the arm is extended straight vertically downwards; and the tracked change of the height of the wrist (107) and the incline angle (173) of the forearm (109) can be used to calculate the incline angle (171) of the upper arm (101).

The wrist (107) of the upper arm (101) can be calculated using a technique illustrated in FIG. 4.

FIG. 4 illustrates the determination of the orientation of a forearm according to one embodiment.

In FIG. 4, the coordinate system $X_1Y_1Z_1$ represents the orientation of the upper arm (101), where the direction $Y_1$ is along the lengthwise direction of the upper arm (101) pointing from the shoulder (100) to the elbow joint (103), as illustrated in FIG. 3. The directions $X_1$ and $Z_1$ are perpendicular to the direction $Y_1$. The direction $Z_1$ is parallel to the direction from the back side of the upper arm (101) to the front side of the upper arm (101); and the direction $X_1$ is parallel to the direction from the inner side of the upper arm (101) to the outer side of the upper arm (101).

When the arm is in a vertical direction pointing downwards with the hand (105) facing the body of the user, the lengthwise directions $Y_1$, $Y_2$, and $Y_3$ of the upper arm (101), the forearm (109), and the hand (105) are aligned with the vertical direction pointing downwards. When in such a position, the inner sides of the forearm (109) and the upper arm (101) are closest to the body of the user; and the outer sides of the forearm (109) and the upper arm (101) are away from the body of the user; the directions $Z_1$, $Z_2$, and $Z_3$ of the upper arm (101), the forearm (109), and the hand (105) are aligned with a direction pointing sideway to the user; and the directions $Z_1$, $Z_2$, and $Z_3$ of the upper arm (101), the forearm (109), and the hand (105) are aligned with a direction pointing to the front of the user.

Thus, the plane $X_1Y_1$ is parallel to the direction $X_1$ from the back side of the upper arm (101) to the front side of the upper arm (101), parallel to the lengthwise direction $Y_1$ of the upper arm (101), and perpendicular to the direction $Z_1$ from the direction from the inner side of the upper arm (101) to the outer side if the upper arm (101). The direction $Z_1$ coincides with an axis of the elbow joint about which the forearm (109) can rotate to form an angle with the upper arm (101) between their lengthwise directions. When the upper arm (101) is extended in the sideway of the user and in a horizontal position, the directions $X_1$ and $Z_1$ are aligned with (in parallel with) the front direction and vertical direction respectively.

The direction $Y_2$ is aligned with the lengthwise direction of the forearm (109) pointing from the elbow joint (103) to the wrist (107).

The direction $Y_3$ is aligned with the lengthwise direction of the hand (105) pointing from the wrist (107) towards the fingers.

When the upper arm (101) is extended in the sideway of the user and in a horizontal position, the directions $Y_1$, $Y_2$, and $Y_3$ coincide with the horizontal direction pointing the sideway of the user.

When the hand (105) is moved to an orientation illustrated in FIG. 4, the hand (105) can be considered to have moved from the orientation of the coordinate system $X_1Y_1Z_1$ through rotating (165) by an angle γ along the lengthwise direction $Y_1$ and then rotating (161) along the shortest arc (161) such that its lengthwise direction $Y_3$ arrives at the direction illustrated in FIG. 4. The rotation (161) along the shortest arc (161) corresponding to a rotation of the direction $Y_1$ by an angle β in a plane containing both the directions $Y_1$ and $Y_3$ along an axis perpendicular to both the directions $Y_1$ and $Y_3$ (i.e., the axis is perpendicular to the plane containing both the directions $Y_1$ and $Y_3$).

In one embodiment, the projection of the direction $Y_3$ in the plane $X_1Y_1$ is assumed to be in the direction of the lengthwise direction $Y_2$ of the forearm (109). The projection represents a rotation (163) of the direction $Y_1$ by an angle α (163) in the plane $Y_1$ along the direction $Z_1$ according to the shortest arc (163).

It is assumed that the rotation (165) of the hand (105) along its lengthwise direction is a result of the same rotation of the forearm (109) along its lengthwise direction while the forearm (109) is initially at the orientation aligned with the coordinate system $X_1Y_1Z_1$. Thus, when the hand (105) has an orientation illustrated in FIG. 4 relative to the orientation ($X_1Y_1Z_1$) of the upper arm (101), the orientation of the forearm (109) is assumed to have moved from the orientation of the coordinate system $X_1Y_1$ by rotating (165) along the lengthwise direction $Y_1$ and then rotating (163) in the plane $X_1Y_1$ along the direction $Z_1$.

After the lengthwise direction $Y_1$ of the upper arm (101) is calculated in a way illustrated and discussed above in connection FIG. 4, the hand orientation, as represented by the coordinate system $X_3Y_3Z_3$ fixedly attached to the hand (105), can be rotated along the shortest arc (161) so that the lengthwise direction $Y_3$ of the hand (105) is rotated to the lengthwise direction $Y_1$ of the upper arm (101). Similarly, the forearm orientation, as represented by the coordinate system $X_2Y_2Z_2$ fixedly attached to the forearm (109), can be rotated along the shortest arc (163) so that the lengthwise direction $Y_2$ of the hand (105) is rotated to the lengthwise direction $Y_1$ of the upper arm (101). The hand orientation and the forearm orientation as having been rotated according to the shortest arcs (161 and 163) respectively to align with the lengthwise direction $Y_1$ of the upper arm (101) may have different twists along the lengthwise direction $Y_1$ of the upper arm (101). The difference in the twists is considered the twist of the upper arm (101). When the twist of the upper arm (101) is added to the forearm orientation as having been rotated to in alignment with the lengthwise direction $Y_1$ of the upper arm (101), the forearm orientation coincides with the hand orientation that has its lengthwise direction $Y_3$ rotated to the lengthwise direction $Y_1$ of the upper arm (101).

After the twist of the upper arm (101) is calculated from the twist difference of the hand orientation and the forearm orientation resulting from their lengthwise directions $Y_3$ and $Y_2$ being rotated to the lengthwise direction $Y_1$ of the upper arm (101)), a difference in the vertical projections of the upper arm (101) and the forearm (109) in the horizontal plane XY can be evaluated. In general, the combination of the bending of the elbow joint (103) and the twist of the of the upper arm (101) can cause the vertical projections of the upper arm (101) and the forearm (109) to be in different directions in the horizontal plane XY.

The correction angle between the vertical projections of the upper arm (101) and the forearm (109) in the horizontal plane can be calculated based on the lengthwise twist of the upper arm (101) and the bending angle of the elbow joint (103), which can be used to calculate an updated estimate of the lengthwise direction $Y_1$ of the upper arm (101). Further, the updated estimate of the lengthwise direction $Y_1$ of the upper arm (101) can be used to calculate an updated twist of the upper arm (101). Through a few iterates, the magnitude of the corrections become small and negligible; and the orientation of the upper arm (101) is obtained.

When the iterative process is used, it is not required that the user movements be limited strictly to the type where the vertical projections of the forearm (109) and the upper arm (101) are in the same direction.

After the orientations of the upper arm (101), the forearm (109) and the hand (105) are obtained, the motion processor (145) can compute the positions of the upper arm (101), the forearm (109) and the hand (105) in a three-dimensional space (relative to the shoulder (100)), which allows the application (147) to present an arm of an avatar in a virtual reality, augmented reality, or mixed reality in accordance with the movement of the arm of the user. The positions of the upper arm (101), the forearm (109) and the hand (105) in a three-dimensional space (relative to the shoulder (100)) can also be used to determine the gesture made by the user in the three-dimensional space to control the application (147).

FIG. 5 shows a method to compute the orientation of an upper arm according to one embodiment. For example, the method of FIG. 5 can be implemented in a system illustrated in FIG. 2 with a forearm module (113) and a handheld module (115) attached to a hand (105) and a forearm (109) in a way illustrated FIG. 1 and using the geometrical relations identified via FIG. 3 and FIG. 4.

In FIG. 5, a computing device (141) receives (201) motion data from a forearm module (113) identifying an orientation of a forearm (109) of a user, receives (203) motion data from a handheld module (115) identifying an orientation of a hand (105) of the user, and calculates (205) an orientation of an upper arm (101) of the user based on the orientation of the forearm (109) of the user, a position of the forearm (109), and the orientation of the hand (105), without using a sensor module on the upper arm (101). The forearm (109) is connected between the hand (105) of the user and the upper arm (101) of the user. The forearm module (113) and/or the handheld module (115) can be configured to determine an elevation/height of a wrist (107) of the user connecting the forearm (109) and the hand (105).

FIG. 6 shows a detailed method to compute the orientation of an upper arm according to one embodiment. For example, the method of FIG. 6 can be used to implement the calculation (205) of the orientation of the upper arm (101) in the method of FIG. 5.

In FIG. 6, the calculation (203) of the orientation $X_2Y_2Z_2$ of the forearm (109) is performed by: projecting (211), on to a horizontal plane XY, a lengthwise direction $Y_2$ of the forearm (109) as a projection of a lengthwise direction $Y_1$ of the upper arm (101) in the horizontal plane XY; calculating (213) an elevation change of the wrist (107) caused by the upper arm (101) tilting out of the horizontal plane XY based on the measured elevation of the wrist (107), the orientation $X_2Y_2Z_2$ of the forearm (109), and a length of the forearm (109); determining (215) the lengthwise direction $Y_1$ of the upper arm (101) based on the calculated elevation change caused by the upper arm (101) tilting out of the horizontal plane XY, by rotating the projection of the lengthwise direction $Y_1$ of the upper arm (101) in a vertical plane $X_1Z_1$ that passes the projection of the lengthwise direction $Y_1$ of the upper arm (101) in the horizontal plane XY to match the elevation change caused by the upper arm (101); determining (217) a first orientation of a coordinate system $X_3Y_3Z_3$ attached to the hand (105) by rotating a lengthwise direction $Y_3$ of the hand (105) along a shortest arc to the lengthwise direction $Y_1$ of the upper arm (101); determining (219) a second orientation of a coordinate system $X_2Y_2Z_2$ attached to the forearm by rotating the lengthwise direction $Y_2$ of the forearm along a shortest arc to the lengthwise direction $Y_1$ of the upper arm (101); determining (221) a relative twist between the first orientation and the second orientation along the lengthwise direction $Y_1$ of the upper arm (101); determining (223) the orientation of the upper arm (101) from the relative twist between the first orientation and the second orientation, and the lengthwise direction $Y_1$ of the upper arm (101).

For example, the forearm module (113) (e.g., smart watch, forearm band) can be calibrated to measure its orientation $X_2Y_2Z_2$ with respect to the chest coordinate system (e.g., X-axis and Y-axis are in the horizontal plane XY; X-axis points to the front/back direction; and Y-axis points to the left/right direction).

It can be assumed (e.g., initially) that the projection of the forearm (109) and upper arm (101) in the horizontal plane XY is in a same line.

For example, the position of the forearm module (113) (relative to the shoulder) can be also tracked. The position of the forearm module (113) provides the elevation level of the forearm module (113) in the Z-axis (vertical direction). The elevation level of the forearm module (113) is the sum of the elevation change caused by the orientation of the forearm (109) and the elevation change caused by the orientation of the upper arm (101). Thus, the elevation change caused by the upper arm (101) pointing downwards (or upwards) can be calculated from the position of the forearm module (113), the orientation of the forearm (109), and the length between the forearm module (113) and the elbow joint (103). The projected direction of the upper arm (101) in the horizontal plane can be rotated in a vertical plane to match the elevation change caused by the upper arm (101), which provides the lengthwise direction of the upper arm (101) in the three-dimensional space.

For example, the handheld module (115) (e.g., handheld controller, ring, dash) can be used to determine the orientation $X_3Y_3Z_3$ of the hand (105).

The orientation relations among hand (105), forearm (109), and upper arm (101) illustrated in FIG. 4 (and further discussed in U.S. patent application Ser. No. 15/787,555, filed Oct. 18, 2017 and entitled "Tracking Arm Movements to Generate Inputs for Computer Systems") can be further used in determining the orientation of the upper arm (101) from the orientation of the forearm (109) and the orientations the hand (105). For example, the relations can be used to determine the rotation of the upper arm (101) about its lengthwise direction $Y_1$ from the orientations of the hand (105) and the orientations of the forearm (109). Specifically, the lengthwise direction $Y_3$ of the hand (105) is rotated along shortest arc to arrive at the lengthwise direction $Y_1$ of the upper arm (101) (e.g., as determined using FIG. 3); and the lengthwise direction $Y_2$ of the forearm (109) is also rotated along shortest arc to arrive at the lengthwise direction $Y_1$ of the upper arm (101). The orientations of the hand (105) and the orientations of the forearm (109) as rotated according to the shortest arcs to arrive at the lengthwise direction $Y_1$ of the upper arm (101) have an orientation twist relative to each other. The twist is along the lengthwise direction $Y_1$ of the upper arm (101). The twist provides an estimated lengthwise rotation of the upper arm (101).

As illustrated in FIG. 2, each of the forearm module (113) and the handheld module (115) is a sensor module that has an inertial measurement unit (IMU) (131, 121) for their orientation measurements. Preferably, the sensor module has a wireless communication device or module (133, 123) for a wireless communication link (117, 119) with the computing device (141). Alternatively, wired connections can be used. The inertial measurement unit (IMU) (131, or 121) of the sensor module (113, or 115) may include a micro-electromechanical system (MEMS) gyroscope, a magnetometer, and/or a MEMS accelerometer.

The method of FIG. 6 allows the calculation of the estimated/approximated orientation of the upper arm (101) without a need for a separate inertial measurement unit or sensor module attached to the upper arm (101) of the user, which arrangement reduces the cost of the system and improves user experiences.

The present disclosure includes methods and apparatuses which perform these methods, including data processing systems which perform these methods, and computer readable media containing instructions which when executed on data processing systems cause the systems to perform these methods.

For example, the computing device (141), the forearm module (113) and/or the handheld module (115) can be implemented using one or more data processing systems.

A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    a first sensor module having an inertial measurement unit and configured to be attached to a forearm of a user and to generate first motion data identifying an orientation of the forearm, wherein the forearm is connected between a hand of the user and an upper arm of the user;
    a second sensor module having an inertial measurement unit and configured to be attached to the hand of the user and to generate second motion data identifying an orientation of the hand, wherein the first sensor module and the second sensor module are configured to determine an elevation of a wrist of the user connecting the forearm and the hand; and
    a computing device communicatively coupled to the first sensor module and the second sensor module through communication links, the computing device configured to calculate, based on the orientation of the forearm, a position of the forearm, and the orientation of the hand, an orientation of the upper arm, wherein the orientation of the upper arm is further calculated based on a lengthwise direction of the upper arm and based on a relative twist between a first orientation corresponding to a coordinate system associated with the hand and a second orientation corresponding to a coordinate system associated with the forearm.

2. The system of claim 1, wherein each of the first sensor module and the second sensor module further includes a communication device for a communication link with the computing device.

3. The system of claim 1, wherein each of the inertial measurement unit of the first sensor module and the inertial measurement unit of the second sensor module includes a micro-electromechanical system (MEMS) gyroscope.

4. The system of claim 3, wherein each of the inertial measurement unit of the first sensor module and the inertial measurement unit of the second sensor module further includes a magnetometer and a MEMS accelerometer.

5. The system of claim 1, wherein the orientation of the upper arm is calculated without an inertial measurement unit attached to the upper arm of the user.

6. The system of claim 1, wherein the orientation of the upper arm is calculated without a sensor module on the upper arm of the user.

7. The system of claim 1, wherein the computing device is configured to calculate the orientation of the upper arm by:
    projecting, on to a horizontal plane, a lengthwise direction of the forearm as a projection of the lengthwise direction of the upper arm in the horizontal plane;
    calculating an elevation change of the wrist caused by the upper arm tilting out of the horizontal plane based on a measured elevation of the wrist, the orientation of the forearm, and a length of the forearm;
    determining the lengthwise direction of the upper arm based on a calculated elevation change caused by the upper arm tilting out of the horizontal plane, by rotating the projection of the lengthwise direction of the upper arm in a vertical plane that passes the projection of the lengthwise direction of the upper arm in the horizontal plane to match the elevation change caused by the upper arm;

determining the first orientation of the coordinate system attached to the hand by rotating a lengthwise direction of the hand along a shortest arc to the lengthwise direction of the upper arm;

determining the second orientation of the coordinate system attached to the forearm by rotating the lengthwise direction of the forearm along a shortest arc to the lengthwise direction of the upper arm;

determining the relative twist between the first orientation and the second orientation along the lengthwise direction of the upper arm.

8. A computer-implemented method comprising:

identifying an orientation of a forearm, by a first sensor module configured to be attached to the forearm of a user and to generate first motion data, wherein the forearm is connected between a hand of the user and an upper arm of the user;

identifying an orientation of the hand by a second sensor module configured to be attached to the hand of the user and to generate second motion data, determining an elevation of a wrist of the user using the first sensor module and the second sensor module, wherein the wrist connects the forearm and the hand; and determining, by a computing device communicatively coupled to the first sensor module and the second sensor module, an orientation of the upper arm based on the orientation of the forearm, a position of the forearm, and the orientation of the hand, wherein the orientation of the upper arm is further determined based on a lengthwise direction of the upper arm and based on a relative twist between a first orientation corresponding to a coordinate system associated with the hand and a second orientation corresponding to a coordinate system associated with the forearm.

9. The computer-implemented method of claim 8 further comprising linking the computing device with each of the first sensor module and the second sensor module.

10. The computer-implemented method of claim 8, wherein identifying an orientation of a forearm comprises generating the first motion data by performing one or more measurements using an inertial measurement unit of the first sensor module, wherein the inertial measurement unit of the first sensor module includes a micro-electromechanical system (MEMS) gyroscope.

11. The computer-implemented method of claim 10, wherein generating the first motion data further comprises performing one or more measurements using a magnetometer and a MEMS accelerometer.

12. The computer-implemented method of claim 8 further comprising calculating the orientation of the upper arm without an inertial measurement unit attached to the upper arm of the user.

13. The computer-implemented method of claim 8 further comprising calculating the orientation of the upper arm without a sensor module on the upper arm of the user.

14. The computer-implemented method of claim 8, wherein the determining the orientation of the upper arm comprises:

projecting, on to a horizontal plane, a lengthwise direction of the forearm as a projection of the lengthwise direction of the upper arm in the horizontal plane;

calculating an elevation change of the wrist caused by the upper arm tilting out of the horizontal plane based on a measured elevation of the wrist, the orientation of the forearm, and a length of the forearm;

determining the lengthwise direction of the upper arm based on a calculated elevation change caused by the upper arm tilting out of the horizontal plane, by rotating the projection of the lengthwise direction of the upper arm in a vertical plane that passes the projection of the lengthwise direction of the upper arm in the horizontal plane to match the elevation change caused by the upper arm;

determining the first orientation of the coordinate system attached to the hand by rotating a lengthwise direction of the hand along a shortest arc to the lengthwise direction of the upper arm;

determining the second orientation of the coordinate system attached to the forearm by rotating the lengthwise direction of the forearm along a shortest arc to the lengthwise direction of the upper arm;

determining the relative twist between the first orientation and the second orientation along the lengthwise direction of the upper arm.

15. A non-transitory computer storage medium storing instructions which, when executed by a computing device, cause the computing device to perform operations comprising:

identifying an orientation of a forearm, by a first sensor module configured to be attached to the forearm of a user and to generate first motion data, wherein the forearm is connected between a hand of the user and an upper arm of the user;

identifying an orientation of the hand by a second sensor module configured to be attached to the hand of the user and to generate second motion data, determining an elevation of a wrist of the user using the first sensor module and the second sensor module, wherein the wrist connects the forearm and the hand; and determining, by a computing device communicatively coupled to the first sensor module and the second sensor module, an orientation of the upper arm based on the orientation of the forearm, a position of the forearm, and the orientation of the hand, wherein the orientation of the upper arm is further determined based on a lengthwise direction of the upper arm and based on a relative twist between a first orientation corresponding to a coordinate system associated with the hand and a second orientation corresponding to a coordinate system associated with the forearm.

16. The non-transitory computer storage medium of claim 15, the operations further comprising linking the computing device with each of the first sensor module and the second sensor module.

17. The non-transitory computer storage medium of claim 15, wherein the operation of identifying an orientation of a forearm comprises generating the first motion data by performing one or more measurements using an inertial measurement unit of the first sensor module, wherein the inertial measurement unit of the first sensor module includes a micro-electromechanical system (MEMS) gyroscope.

18. The non-transitory computer storage medium of claim 17, wherein the operation of generating the first motion data comprises performing one or more measurements using a magnetometer and a MEMS accelerometer.

19. The non-transitory computer storage medium of claim 15 further comprising:
- calculating the orientation of the upper arm without an inertial measurement unit attached to the upper arm of the user; and
- calculating the orientation of the upper arm without a sensor module on the upper arm of the user.

20. The non-transitory computer storage medium of claim 15, the operations of determining the orientation of the upper arm comprises:
- projecting, on to a horizontal plane, a lengthwise direction of the forearm as a projection of the lengthwise direction of the upper arm in the horizontal plane;
- calculating an elevation change of the wrist caused by the upper arm tilting out of the horizontal plane based on a measured elevation of the wrist, the orientation of the forearm, and a length of the forearm;
- determining the lengthwise direction of the upper arm based on a calculated elevation change caused by the upper arm tilting out of the horizontal plane, by rotating the projection of the lengthwise direction of the upper arm in a vertical plane that passes the projection of the lengthwise direction of the upper arm in the horizontal plane to match the elevation change caused by the upper arm;
- determining the first orientation of the coordinate system attached to the hand by rotating a lengthwise direction of the hand along a shortest arc to the lengthwise direction of the upper arm;
- determining the second orientation of the coordinate system attached to the forearm by rotating the lengthwise direction of the forearm along a shortest arc to the lengthwise direction of the upper arm;
- determining the relative twist between the first orientation and the second orientation along the lengthwise direction of the upper arm.

* * * * *